Patented Nov. 28, 1950

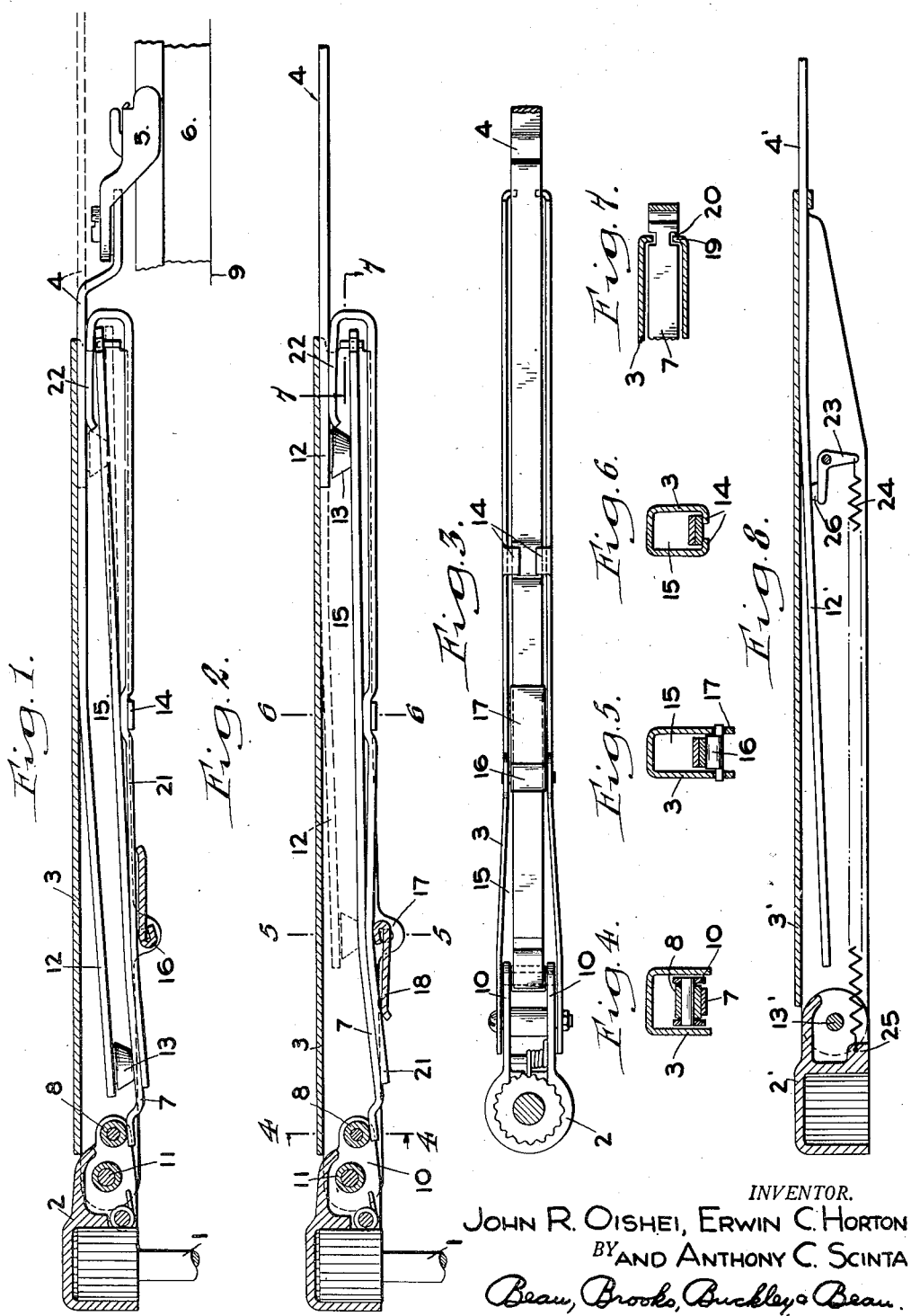

2,531,889

UNITED STATES PATENT OFFICE 2,531,889

WINDSHIELD CLEANER

John R. Oishei, Buffalo, Erwin C. Horton, Hamburg, and Anthony C. Scinta, Buffalo, N. Y., assignors to Trico Products Corporation, Buffalo, N. Y.

Application June 2, 1944, Serial No. 538,490

16 Claims. (Cl. 15—250)

This invention relates to the art of cleaning the windshields or windows of motor vehicles, and the like, and has particular reference to the wiper carrying arm of the windshield cleaner. It has heretofore been proposed to make the wiper arm of variable length whereby adapting the arm to windshields of various sizes, but such arm adjustment has been made at the sacrifice of the desired contact pressure of the wiper on the glass. This wiping pressure is factory-determined by incorporating a certain resilient factor in the arm fabrication at the time of manufacture. When the length of the arm is changed it is obvious that the leverage is varied and the resiliency increased or decreased in accordance with the length adjustment of the arm. Consequently, the wiping action and efficiency will be altered.

The present invention has for its object to provide a longitudinally adjustable wiper arm which will afford a uniform wiping pressure throughout its varied adjustments.

Furthermore, the invention has for its aim the provision of a practical wiper arm which is universal in its adaptability and is efficient in all positions of adjustment.

In the drawings

Fig. 1 depicts a wiper arm part in longitudinal section and part in side elevation and constructed in accordance with the teaching of the present invention, the arm being in its contracted position;

Fig. 2 is a similar view illustrating the arm extended;

Fig. 3 is a bottom plan view of the arm shown in Fig. 1;

Figs. 4, 5, 6, and 7 are cross sectional views about on lines 4—4, 5—5, 6—6, and 7—7, respectively of Fig. 2; and Fig. 8 is a view like Fig. 1 but showing a modification thereof.

Referring more particularly to the accompanying drawing, the numeral 1 designates the actuating shaft of a windshield cleaner on which is removably mounted the improved wiper arm. This arm comprises a mounting section 2, a pivotally connected section 3, and an extensible wiper carrying section 4, the latter having a terminal fitting 5 by which the wiper or blade 6 is detachably coupled thereto. A flat spring 7 is carried by the intermediate section 3 and extends inwardly toward and bears upon a part 8 of the innermost section 2 to urge the wiper toward the glass surface of the windshield 9. As shown in Fig. 3 the part 8 is in the form of a roller bearing which is journaled between a pair of bracket arms 10 on the inner section beyond the pivot 11 for the intermediate section. If the outermost or wiper carrying section 4 is in extended position the spring will have to act through a longer work arm, and if the spring tension is constant, the pressure in the wiping contact of the blade on the glass will be relatively light; if the arm is fully contracted or telescoped, the spring pressure will be the heaviest because of the shortened work arm through which the spring acts.

In accordance with the present invention the spring tension is increased as the work arm is lengthened and decreased as the work arm is shortened. To this end means are provided to regulate the spring tension automatic with and by and during the act of arm adjustment. Movable with the outer section 4 is a spring tensioning member 12 having a shoe 13 riding upon the flat spring 7 to deflect or tend to deflect the latter. In its fully telescoped position of Fig. 1 the outer section disposes the tensioning member 12 adjacent the bearing part 8 wherein it has a maximum influence on the spring, the latter being given a cantilever or fulcrum support by the lugs 14 as the intermediate section 3 swings on its pivotal mounting 11.

The outer section 4 and the tensioning member 12 may be formed from a single strip of spring steel, or other suitable material, the inherent resiliency of the spring leaf which constitutes the tensioning member acting in opposition to that of the flat spring 7. Being in strip form the unit 4, 12, is conveniently mounted within the chamber or channel 15 of the intermediate section for sliding adjustment. Therefore, as the outer section is withdrawn from the channeled intermediate section the tensioning member 12 will ride upon the flat spring under a gradually increasing pressure opposing the action of the spring, the tensioning member acting in the capacity of a cam. However, by reason of the fact that the shoe is riding up the flat spring toward its anchorage 14 the resultant force will have a gradually decreasing effect on the spring until the shoe rests directly above the point of anchorage when the effect of the tensioning member on the spring will be nil or zero.

A continued withdrawal of the extensible section will carry the shoe over and beyond the spring anchorage whereupon the spring will function as a lever of the first class instead of one of the third class. It will be observed that during this continued withdrawal of the extensible section the spring leaf which forms the tensioning member is also flexed to a point where it exerts a maximum pressure on the flat spring 7, such position being depicted by the broken lines in Fig. 1. The resultant force exerted upon the wiper arm by the spring will at this point be at a minimum and the arm will be adjusted to its maximum length.

Under certain conditions it is desirable to have a heavier contact pressure for the wiper upon the glass and this may be accomplished by shortening the effective length of the flat spring 7, as by means of a supplemental support 16 between the anchorage 14 and the free end which rides on the roller bearing 8. This supplemental fulcrum may be given trunnioned support in ears 17 on the sides of the channel 15, the handle part 18 being movable from the idle position, in Fig. 1, to the active position, in Fig. 2, wherein the support 16 exerts an inward deflecting pressure upon the flat spring with the result that a heavy wiping pressure is supplied. The tensioning member 12 will not impress itself upon the spring when directly above the supplemental support 16, the dotted position of Fig. 2.

To hold the flat spring in place its outer end is slidably connected to the intermediate section, as by keeper lugs 19 on the latter being turned into marginal notches 20 of the spring as shown in Fig. 7. This connection readily permits movement of the spring as and when acted upon by the tensioning member during arm adjustment.

The flat spring 7 may be given reinforcement by a supplemental spring leaf 21 supported in place by the fulcrum or anchoring lugs 14, the outer end of the supplemental leaf being extended across the end of the flat spring and back into the channel 15. This arrangement not only closes the outer end of the channel but the terminal portion 22 constitutes a friction shoe which holds the extensible section in its adjusted position and up against the bottom of the channel. Additionally the shoe provides an abutment or stop to be engaged by the shoe 13 to preclude displacement of the section.

In the modification of Fig. 8, the automatic tensioning principle is applied to a wiper arm utilizing a coil type spring. The arm comprises a mounting section 2' connected by a pivot 13' to the intermediate section 3' of channeled shape. A bell crank lever 23 is pivotally mounted within the channel and has one arm joined by a coil spring 24 to an anchor part 25 on the mounting section. The other arm is provided with a shoe 26 designed to ride upon the resilient tensioning member 12' of the extensible wiper carrying section 4'. As the arm is being extended, the tensioning member acts to increase the spring force necessary for maintaining a substantially uniform wiping contact with the windshield. The resiliency in the tensioning member acts in opposition to that in the coil spring in securing the desired adjustment.

From the foregoing it will be noted that the improved wiper arm will serve to maintain an efficient wiping pressure while permitting longitudinal adjustment of the arm for adapting it to windshields of various dimensions or to enable the motorist shifting the wiper to clean a different area of the window. While the foregoing description has been given in detail, such is not intended by way of limitation since the inventive principles involved are capable of assuming other physical embodiments without departing from the spirit of the invention or the scope of the appended claims.

What is claimed is:

1. A wiper arm having a mounting section, an intermediate section pivotally mounted thereon for swinging toward the surface being wiped, an extensible section movably carried by the intermediate section for adjusting the longitudinal dimension of the arm and having means for attaching a wiper, and spring means operatively engaged with the mounting section and the intermediate section independently of the extensible section and acting to urge the latter section toward such surface for providing the desired pressure in the contact of the wiper therewith, said intermediate section housing said spring means, and said extensible section telescoping within the intermediate section and carrying a longitudinally arranged cam for movement therein, said spring means having a part in the path of said cam to be acted upon thereby by and during adjustment of the extensible section for varying the tension of said spring means.

2. A wiper arm having a mounting section, an intermediate section pivotally mounted thereon for swinging toward the surface being wiped, an extensible section movably carried by the intermediate section for adjusting the longitudinal dimension of the arm and having means for attaching a wiper, spring means operatively engaged with the mounting section and the intermediate section independently of the extensible section and acting to urge the latter section toward such surface for providing the desired pressure in the contact of the wiper therewith, said intermediate section having a chamber housing the spring means, and a spring tensioning member arranged on the intermediate section and acting upon the spring means to distort the latter to increase the urge of said spring means by and during arm-lengthening adjustment of the extensible section and thereby maintain a substantially uniform contact pressure throughout the arm adjustment.

3. A wiper arm having a mounting section, an intermediate section pivotally mounted thereon for swinging toward the surface being wiped, an extensible section movably carried by the intermediate section for adjusting the longitudinal dimension of the arm and having means for attaching a wiper, spring means operatively engaged with the mounting section and the intermediate section independently of the extensible section and acting to urge the latter section toward such surface for providing the desired pressure in the contact of the wiper therewith, said spring means including a part adapted to be displaced for varying its urge, and a cam part slidably engaging the spring part to displace the same and movable by and during adjustment of the extensible section for so sliding the cam part.

4. A wiper arm having a mounting section, an intermediate section pivotally mounted thereon for swinging toward the surface being wiped, an extensible section movably carried by the intermediate section for adjusting the longitudinal dimension of the arm and having means for attaching a wiper, a flat spring carried by the intermediate section independently of the extensible section and supported at one end under lateral flexure by a part on the mounting section off-center from the pivotal axis for urging said intermediate section toward the surface being wiped, and a spring tensioning member acting upon the flat spring to distort the same during arm-lengthening adjustment of the extensible section for regulating the urge of the flat spring on the intermediate section.

5. A wiper arm having a mounting section, an intermediate section pivotally mounted thereon for swinging toward the surface being wiped, an extensible section movably carried by the intermediate section for adjusting the longitudinal dimension of the arm and having means for attaching a wiper, a flat spring carried by the intermediate section independently of the extensible section and supported at one end under lateral flexure by a part on the mounting section off-center from the pivotal axis for urging said intermediate section toward the surface being wiped, and a tensioning member acting upon the flat spring and operable by adjustment of the extensible section for regulating the urge of the flat spring on the intermediate section, said tensioning member constituting an integral part of the extensible section and being angularly related to the flat spring to cam thereon for so regulating the urge.

6. A wiper arm having a mounting section, an intermediate section pivotally mounted thereon and being channel-shaped in cross section, an extensible section slidable within the channel, and a flat spring carried by the intermediate section independently of the extensible section and supported at one end under lateral flexure by a part on the mounting section for urging the intermediate section toward the surface being wiped, said extensible section having an angular part within the channel riding upon the flat spring to distort the latter during adjustment of the extensible section for increasing the spring urge upon said intermediate section during an arm-lengthening adjustment of the extensible section.

7. A wiper arm having a mounting section, an intermediate section pivotally mounted thereon and being channel-shaped in cross section, an extensible section slidable within the channel, and a flat spring carried by the intermediate section independently of the extensible section and supported at one end under lateral flexure by a part on the mounting section for urging the intermediate section toward the surface being wiped, said extensible section having an angular part within the channel acting resiliently upon the flat spring to distort the latter during an arm-lengthening adjustment of the extensible section to increase the spring urge upon the intermediate section.

8. A wiper arm having a mounting section, an intermediate section pivotally mounted thereon and being channel-shaped in cross section, an extensible section slidable within the channel, a flat spring carried by the intermediate section independently of the extensible section and supported at one end under lateral flexure by a part on the mounting section for urging the intermediate section toward the surface being wiped, said extensible section having an angular part within the channel riding upon the flat spring during adjustment of the extensible section for modifying the spring urge upon said intermediate section, and fulcrum means supporting the flat spring on the intermediate section at a point intermediate its length, said angular part being slidable along the flat spring across the point of fulcrum support whereby to act upon the spring at both sides thereof.

9. A wiper arm having a mounting section, an intermediate section pivotally mounted thereon and being channel-shaped in cross section, an extensible section slidable within the channel, a flat spring carried by the intermediate section independently of the extensible section and supported at one end under lateral flexure by a part on the mounting section for urging the intermediate section toward the surface being wiped, said extensible section having an angular part within the channel riding upon the flat spring during adjustment of the extensible section for modifying the spring urge upon said intermediate section, and adjustable fulcrum means supporting the flat spring on the intermediate section at a point intermediate its length, said angular part being slidable along the flat spring across the point of fulcrum support whereby to act upon the spring at both sides thereof.

10. A wiper arm having a mounting section, an intermediate section pivotally mounted thereon and being channel-shaped in cross section, an extensible section slidable within the channel, a flat spring carried by the intermediate section independently of the extensible section and supported at one end under lateral flexure by a part on the mounting section for urging the intermediate section toward the surface being wiped, said extensible section having an angular part within the channel acting to deflect the flat spring laterally during arm-lengthening adjustment of the extensible section for increasing the spring urge upon said intermediate section, and a supplemental flat spring supporting the first flat spring and having an extension guidingly supporting the latter in the channel.

11. A wiper arm having a mounting section, an intermediate section pivotally mounted thereon and being channel-shaped in cross section, an extensible section slidable within the channel, a flat spring carried by the intermediate section independently of the extensible section and supported at one end under lateral flexure by a part on the mounting section for urging the intermediate section toward the surface being wiped, said extensible section having an angular part within the channel acting resiliently upon the flat spring to modify the urge of the latter upon the intermediate section when adjustment of the extensible section is made, and fulcrum means supporting the flat spring on the intermediate section at a point intermediate its length, said angular part being slidable along the flat spring across the point of fulcrum support whereby to act upon the spring at both sides thereof.

12. A wiper arm having a mounting section, an intermediate section pivotally mounted thereon, an extensible section slidable on the intermediate section, a coil spring anchored at one end on the mounting section, a lever connected to the opposite end of the spring and rockable upon the intermediate section to increase the tension of the spring, and means operable by and during an arm lengthening adjustment of the extensible section for so rocking the lever.

13. A wiper arm having a mounting section, an intermediate section pivotally mounted thereon and being channel-shaped in cross section, an extensible section slidable in the channel of the intermediate section, and spring means in the form of a flat spring having one end interlocked with a part on the intermediate section and its opposite end supported under lateral flexure by a part on the mounting section for urging the intermediate section toward the surface being wiped, said spring means including a friction shoe arranged in the channel of the intermediate section and bearing upon the extensible section at a point longitudinally spaced from the interlocked end to bindingly secure the extensible section in its adjusted position.

14. A wiper arm having a mounting section, an intermediate section pivotally mounted thereon and being channel-shaped in cross section, an extensible section slidable in the channel of the intermediate section, and spring means in the form of a flat spring having one end interlocked with a part on the intermediate section and its opposite end supported under lateral flexure by a part on the mounting section for urging the intermediate section toward the surface being wiped, said spring means including a friction shoe arranged in the channel of the intermediate section and bearing upon the extensible section to bindingly secure the latter in its adjusted position, the channel wall of the intermediate section having a portion underlying the flat spring intermediate its ends to give support thereto and to hold said flat spring within the channel.

15. A wiper arm having a mounting section, an intermediate section pivotally mounted thereon and being channel-shaped in cross section, an extensible section slidable in the channel of the intermediate section, spring means in the form of a flat spring having one end interlocked with a part on the intermediate section and its opposite end supported under lateral flexure by a part on the mounting section for urging the intermediate section toward the surface being wiped, said spring means including a friction shoe arranged in the channel of the intermediate section and bearing upon the extensible section to bindingly secure the latter in its adjusted position, and cam means journaled on the intermediate section and acting upon the flat spring intermediate its ends for adjusting its tension.

16. A wiper arm having a mounting section, an intermediate section pivotally mounted at one end thereon for swinging toward and from the surface being wiped, spring means carried by one section and acting upon the other section to urge the opposite end of the intermediate section toward such surface, and an extensible section telescopic upon said opposite end of the intermediate section for adjusting the longitudinal dimension of the arm and having means for attaching a wiper, said extensible section having a wedge part movable lengthwise of the arm upon adjustment of said extensible section, and said spring means having a part engageable by said wedge part for being deflected thereby during the adjustment of the extensible section for varying the tension of said spring means.

JOHN R. OISHEI.
ERWIN C. HORTON.
ANTHONY C. SCINTA.

REFERENCES CITED

The following references are of record in the file of this patent:

UNITED STATES PATENTS

| Number | Name | Date |
| --- | --- | --- |
| 1,062,322 | Conant | May 20, 1913 |
| 1,368,982 | Beitman | Feb. 15, 1921 |
| 2,156,505 | Marcolivio | May 2, 1939 |
| 2,260,903 | Horton | Oct. 28, 1941 |
| 2,392,670 | Horton | Jan. 8, 1946 |